Oct. 24, 1939.  V. E. GLEASMAN  2,177,213
TRANSMISSION
Filed Nov. 5, 1937   5 Sheets-Sheet 1
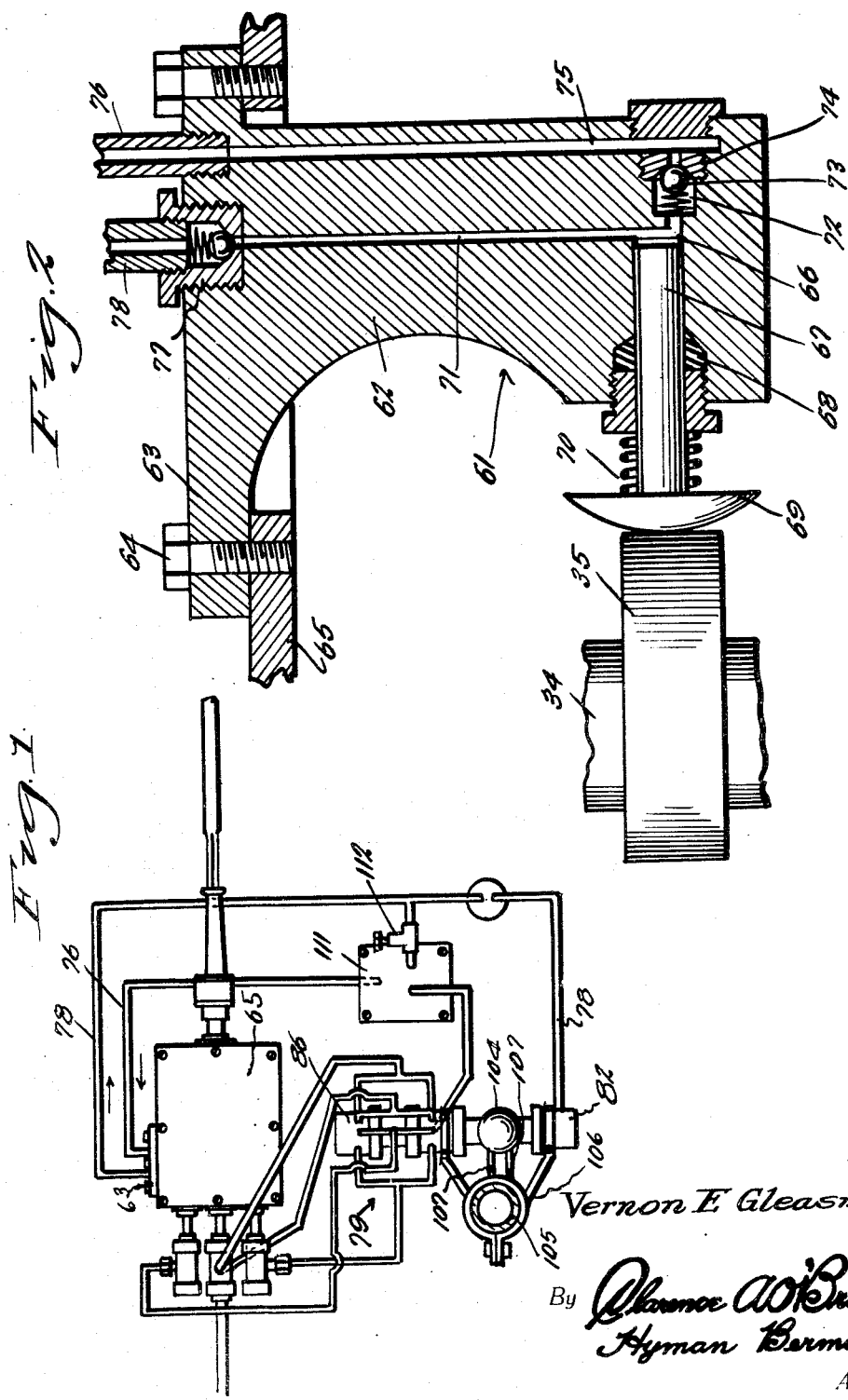
Inventor
Vernon E. Gleasman
By Clarence A. O'Brien
Hyman Berman
Attorneys

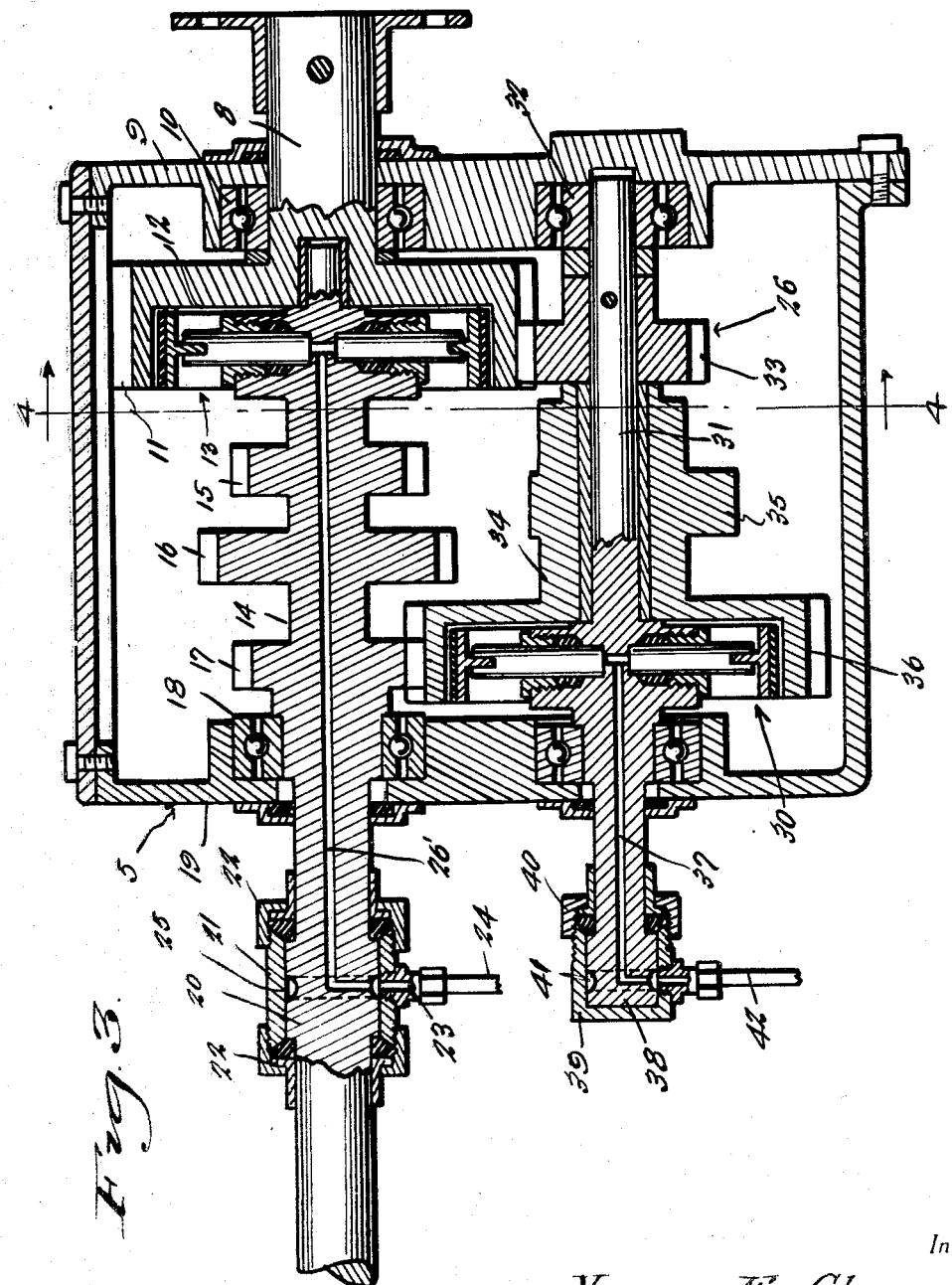

Oct. 24, 1939.  V. E. GLEASMAN  2,177,213
TRANSMISSION
Filed Nov. 5, 1937  5 Sheets-Sheet 4
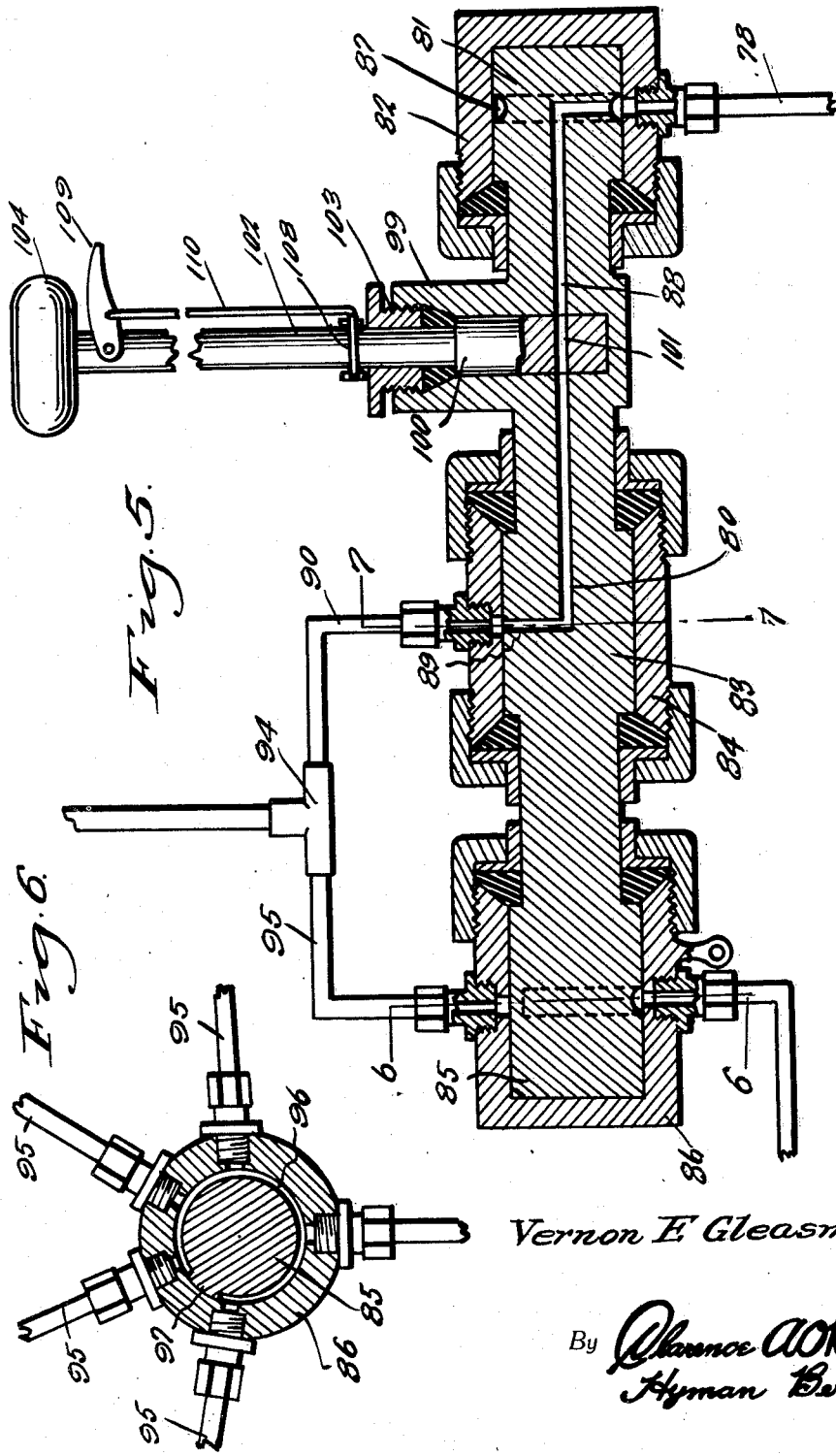
Inventor
Vernon E. Gleasman
By Clarence A. O'Brien
Hyman Berman
Attorneys

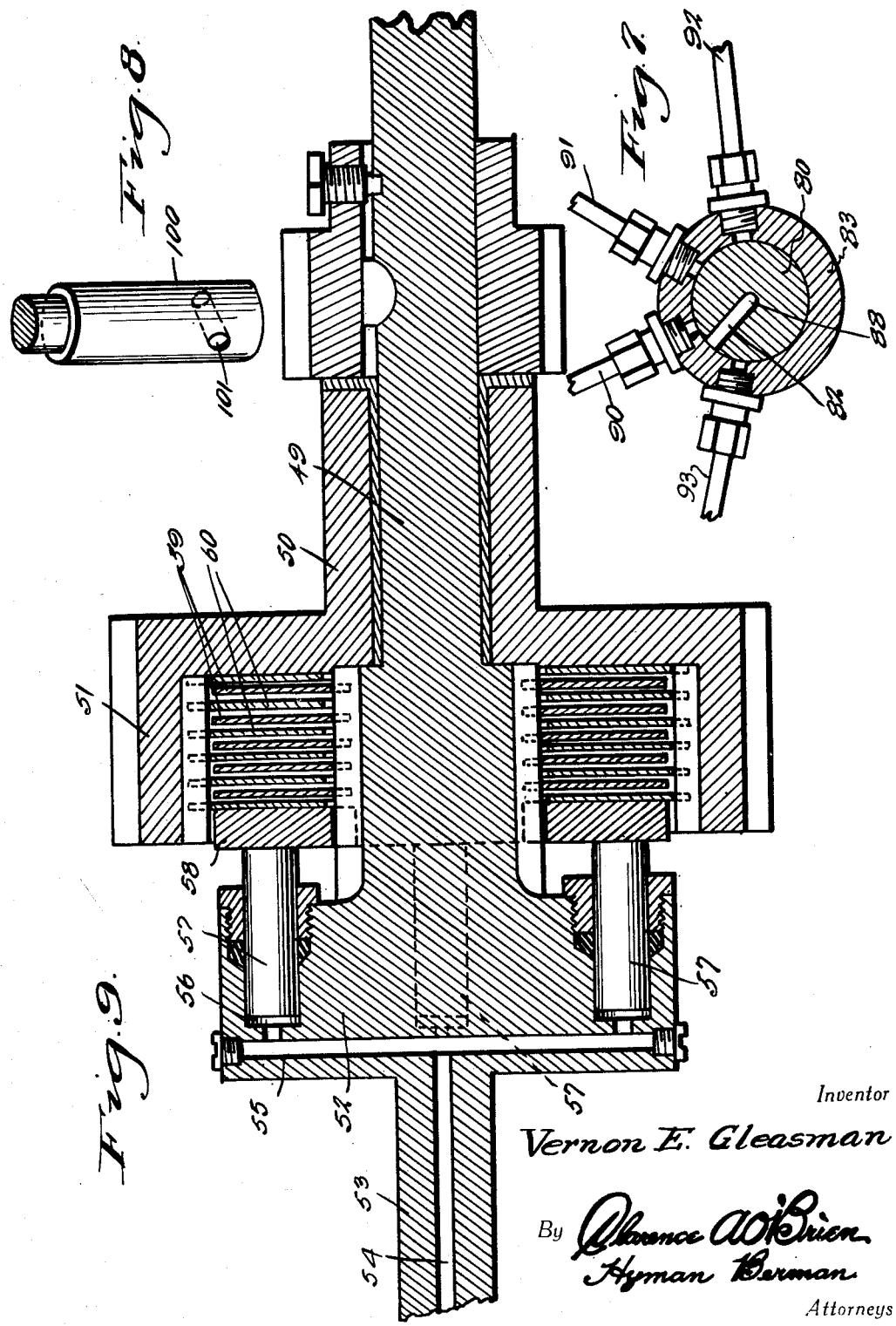

Patented Oct. 24, 1939

2,177,213

UNITED STATES PATENT OFFICE 2,177,213

TRANSMISSION

Vernon E. Gleasman, Boonville, N. Y.

Application November 5, 1937, Serial No. 173,015

2 Claims. (Cl. 74—364)

This invention appertains to new and useful improvements in transmissions such as are employed in automobile drives and in which there are the usual high, low and intermediate gears, as well as a reverse gear.

The principal object of the present invention is to provide a transmission in which the desired gears are connected in driving relation by fluid pressure means.

Another important object of the invention is to provide means whereby transmission gear changing can be accomplished in a much more convenient and efficient manner than through the agency of means now in general use.

Other important objects and advantages of the invention will become apparent to the reader of the following specification.

In the drawings:

Figure 1 represents a diagrammatic view showing the control valve, transmission, and fluid pressure lines connected therewith.

Figure 2 is a fragmentary detail sectional view showing the pump means.

Figure 3 is a longitudinal sectional view through the transmission the section being taken on the line 3—3 of Figure 4.

Figure 5 is a longitudinal sectional view through the control valve.

Figure 6 is a sectional view taken substantially on the line 6—6 of Figure 5.

Figure 7 is a sectional view taken substantially on the line 7—7 of Figure 5.

Figure 8 is a fragmentary perspective view of the vertical rotary valve element.

Figure 9 is a fragmentary longitudinal sectional view through a modified form of gear clutch.

Figure 4:
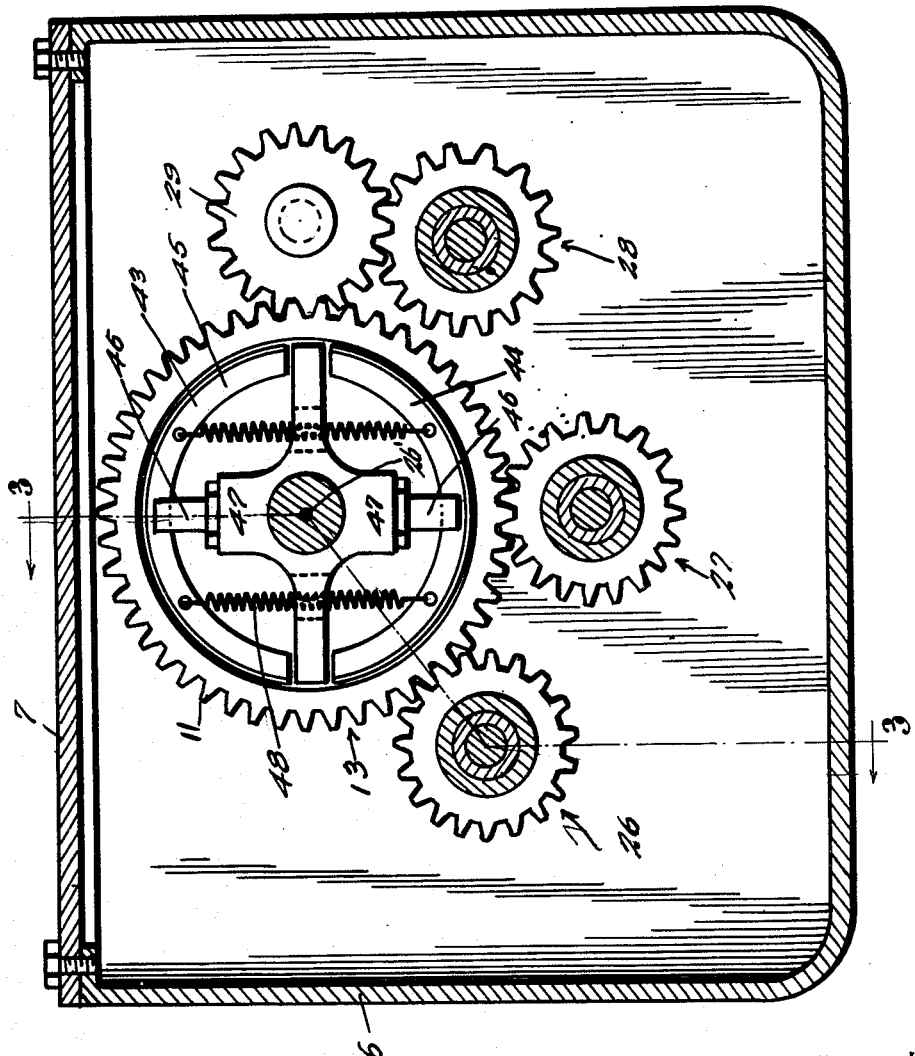
Figure 4 is a vertical sectional view taken substantially on the line 4—4 of Figure 3.

Referring to Figures 3 and 4, it can be seen that numeral 5 generally refers to the transmission and this consists of the case 6 and the removable cover 7. Numeral 8 denotes the driven shaft which is disposed through the rear wall 9 of the case 5 and through the bearing mount 10, terminating at its front end in the large gear 11 which is formed with the pocket 12 for receiving the clutch mechanism generally referred to by numeral 13. This clutch mechanism 13 is located on the drive shaft section 14 which carries the gears 15, 16 and 17. The drive shaft section 14 is disposed through the ball bearing mount 18 in the front wall 19 and has the enlarged portion 20 operating in the case 21. This case is provided with a pack flange 22 at each end thereof and has the nipple 23 extending from the side thereof and connected to the tube 24. The nipple 23 communicates with the inside of the case 21 at the circumferentially extending groove 25 in the shaft 14. From this groove 25 extends a duct which connects with the longitudinally extending duct 26' having its forward terminal at the clutch 13.

As shown in Figure 4, the transmission includes the counter assemblies generally referred to by numerals 26, 27 and 28, taking care of low gear drive and intermediate gear drive, and thirdly the reverse drive, the assembly 28 of course driving shaft 8 in reverse direction by the intermediate gear 29. Each of these shafts 26, 27 and 28 is provided with a clutch mechanism connected with the shaft 14. The clutch mechanism 30 is shown in Figure 3 for the low gear assembly, while additional clutch assemblies are employed (but not shown) for the assemblies 27 and 28 and mesh with the gears 16 and 15 shown in Figure 3.

As these assemblies 27 and 28 are constructed in substantially the same manner as the assembly 26, it is thought that illustration and description of the one assembly 26 will suffice.

As is clearly shown in Figure 3, of the assembly 26 numeral 31 represents the countershaft which has one end disposed into the bearing assembly 32 in the rear wall 9. Keyed to this shaft 31 is the pinion 33 which meshes with the gear 11 of the clutch assembly 13.

Numeral 34 represents a barrel on the shaft 31 which carries the cam formation 35 and also the large gear 36 which is hollow to accommodate the clutch mechanism 30 carried by the shaft 31. This shaft 31 has the duct 37 leading from its clutch 30 to the head 38 at its front end which is located within the case 39 and provided with packing means 40. From this case 39 in a position opposed to the circumferential groove 41 of the shaft 31 and communicating with the duct 37 extends the fluid line 42. As can be seen in Figure 4, each of these clutches consists of upper and lower shoes 43—44 each having an inwardly disposed flange 45 adapted to be straddled by the bifurcated end portion of the corresponding plunger 46. These plungers are slidable through packing glands 47 in their corresponding shafts, and springs 48 connect the shoes 43—44, normally tending to hold the same away from a corresponding gear. The pressure fluid exerted through the corresponding shaft duct and against the plungers 46 serves to urge the plungers outwardly, resulting in the binding of the shoes against the corresponding gears so that the shaft carrying the clutch is positively connected with the shaft carrying the gear.

A modified form of clutch is shown in Figure 9 wherein numeral 49 discloses the primary shaft and numeral 50 the secondary shaft which is hollow and in the form of a sleeve on the shaft 49. The shaft 50 carries the large hollow gear 51. The shaft 49 has the enlarged formation 52 from which the shaft extension 53 extends. The shaft extension 53 has the fluid pressure duct 54 therein leading to the lateral ducts 55 which communicate with the cylinders 56 in which the plungers 57 are operative. These plungers 57 operate against the follower annulus 58 which in turn presses the clutch plates 59—60 of the shaft 49 and gear 51 together. This form of clutch is a substitute for the preferred form as shown in Figure 4.

As shown in Figure 2, numeral 61 generally refers to the pump which consists of the body 62 having the leg portion 63 secured by suitable means 64 to a support 65. The body 62 has the cylinder bore 66 therein in which the plunger 67 is slidable, this plunger being operative through the packing gland 68 and provided with a convex head 69 at its outer end for riding engagement with the cam 35 on the barrel 34. (Also see Figure 3.) Interposed between the plug of the packing gland 68 and the head 69 is a coiled compressible spring 70.

Communicating with the cylinder bore 66 is the duct 71 which extends longitudinally of the body 62. Also communicating with the cylinder 66 is the pocket 72 in which the ball 73 is operative. The ball 75 acts as a check valve in conjunction with the seat 74, the seat having an opening therethrough communicating with the duct 75 which extends longitudinally of the body 62 and is in communication with the pipe line 76.

A check valve structure 77 is located in the body 62 at the outer end of the duct 71 and with this connects the tube 78 which supplies fluid under pressure to the valve assembly generally referred to by numeral 79 and shown in detail in Figures 5 and 6.

This valve consists of the elongated horizontally disposed shaft 80, having the head 81 operative in the packing gland 82, the enlarged portion 83 operative in the packing gland 84 and the enlarged head 85 operative in the packing gland 86.

In the head 81 is the circumferentially extending groove 87 from which an inwardly extending port extends to communicate with the axially disposed duct 88 in the shaft 80. This duct 88 opens by way of a port 89 laterally through the shaft 80 at the packing gland 83 and by rotating the shaft 80, this port 89 can be communicated with any one of the tubes 90, 91, 92 or 93, the tube 93 being for the reverse gear.

Each of these tubes 90, 91, 92 and 93 extends to a T-fitting 94 from which extends a return pipe 95 to the corresponding port in the gland 86. At this point the head 85 is provided with a circumferentially extending groove 96 which extends substantially around the entire head 85 with the exception of the portion 97 which serves as a shut-off for the various ports in the gland 86 so that as the shaft 80 is rotated to supply fluid under pressure to any one of the gear coupling clutches aforementioned, the raised portion 97 will serve as a valve closing the corresponding return pipe 95 so long as the shaft 80 is holding the port 88 in communication with any one of the pipes 90, 91, 92 and 93. Means for rotating the shaft 80 consists of the cylindrical formation 99 extending laterally from the shaft 80 and having the rotatable valve element 100 therein. This is provided with the transverse port 101 normally aligned with the duct 88. The valve element 100 has the outstanding hand bar 102 extending through the packing gland 103. The outer end of the hand bar 102 has the handle 104. This hand bar and handle are preferably located adjacent the usual steering shaft 105 of an automobile structure and clamped to the housing of the shaft by suitable means 106 is a projecting structure 107 which serves as a stop for the slidable member 108 on the hand bar 102. This slidable member 108 can be lifted by pulling upwardly on the lever 109, the latter being connected by the rod 110 to the said slidable member 108. This is only utilized when the shaft 80 is to be shifted to gear reversing position, that is when the port 89 is to be communicated with the tube 93. (See Figures 5 and 7.)

When it is desired to entirely shut off the shaft 80 from the tube 78, the valve element 100 is rotated.

Referring to the diagrammatic use of Figure 1 it can be seen that numeral 111 represents the reservoir for the fluid and that between the supply pipe 78 and the reservoir 111 is the by-pass valve 112 which will pass the fluid into the reservoir 111 whenever the pressure of the system becomes excessive or, when the valve assembly 79 is cut off from the system.

While the foregoing specification sets forth the invention in specific terms, it is to be understood that numerous changes in the shape, size and material may be resorted to without departing from the spirit and scope of the invention as claimed hereinafter.

Having described the invention what is claimed as new is:

1. Transmission means of the class described comprising a driven shaft, a gear connected with the driven shaft and having a pocket therein, a plurality of countershafts, a gear on each countershaft meshing with the gear of the driven shaft, a drive shaft having a part located in the pocket of the gear of the driven shaft, fluid actuated clutch means carried by said part of the drive shaft for connecting the drive shaft to the gear of the driven shaft, a plurality of gears carried by the drive shaft, a tubular shaft rotatably arranged on each countershaft, a gear carried by each tubular shaft and having a pocket therein, each of the gears of the tubular shafts meshing with a gear of the drive shaft, fluid clutch means carried by each countershaft and located in a pocket of the gear of the tubular shaft mounted on said countershaft, a fluid system including conduits connected with all the clutch means, a pump in the system, means for actuating the pump from one of the tubular shafts and manually operated means for controlling the flow of fluid from the pump to the conduits.

2. Transmission means of the class described comprising a driven shaft, a gear connected with the driven shaft and having a pocket therein, a drive shaft having a part located in the pocket, clutch means located in the pocket and including plungers carried by said part of the drive shaft, a plurality of countershafts each having a gear thereon, an idle gear meshing with one of the last-mentioned gears and with the gear of the driven shaft, the gears of the other countershafts meshing with the gear of the driven shaft, a tubular shaft on each countershaft, a gear, having a pocket therein, connected with each tubular shaft, intermediate, slow and reverse speed gears on the drive shaft meshing with the gears of the tubular shafts, clutch means in the pockets of the gears of the tubular shafts, each clutch means including plungers, conduits in the drive and countershafts leading to the plungers, a fluid tank, a pump, means for driving the same from one of the tubular shafts, means for connecting the inlet of the pump with the tank, a conduit leading from the outlet of the pump, valve means connected with the last-mentioned conduit, manually operated means for actuating the valve means, conduits leading from the valve means to the conduits in the shafts, said valve means selectively connecting the conduits leading from the outlet of the pump to the conduits of the shafts, a return conduit leading from the valve means to the tank and by-pass means controlled by the valve means for connecting the return conduit to the conduits which connect the valve means to the conduits of the shafts for returning the fluid to the tank from all of the conduits excepting the one which is in communication with the clutch means.

VERNON E. GLEASMAN.